Patented Mar. 11, 1947

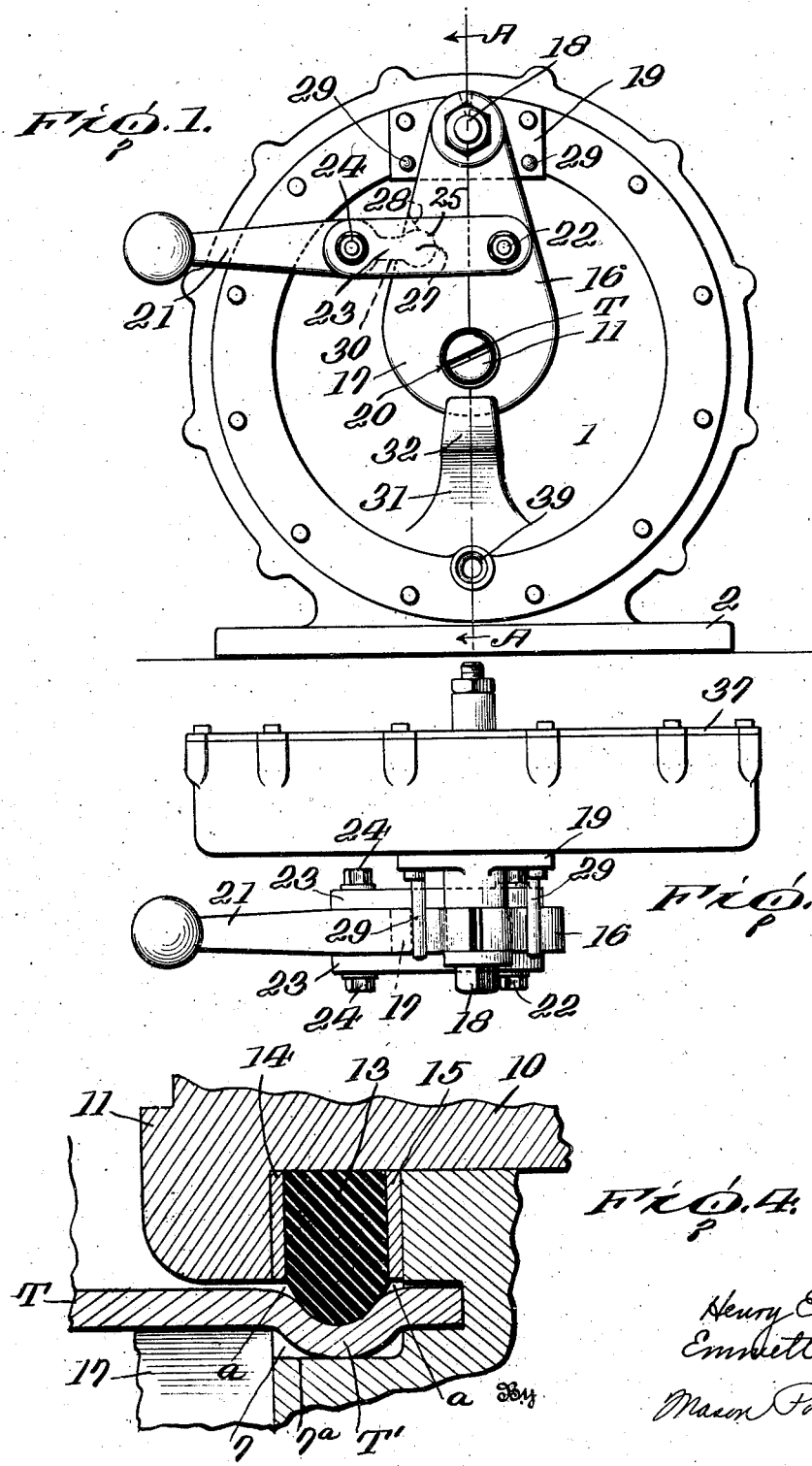

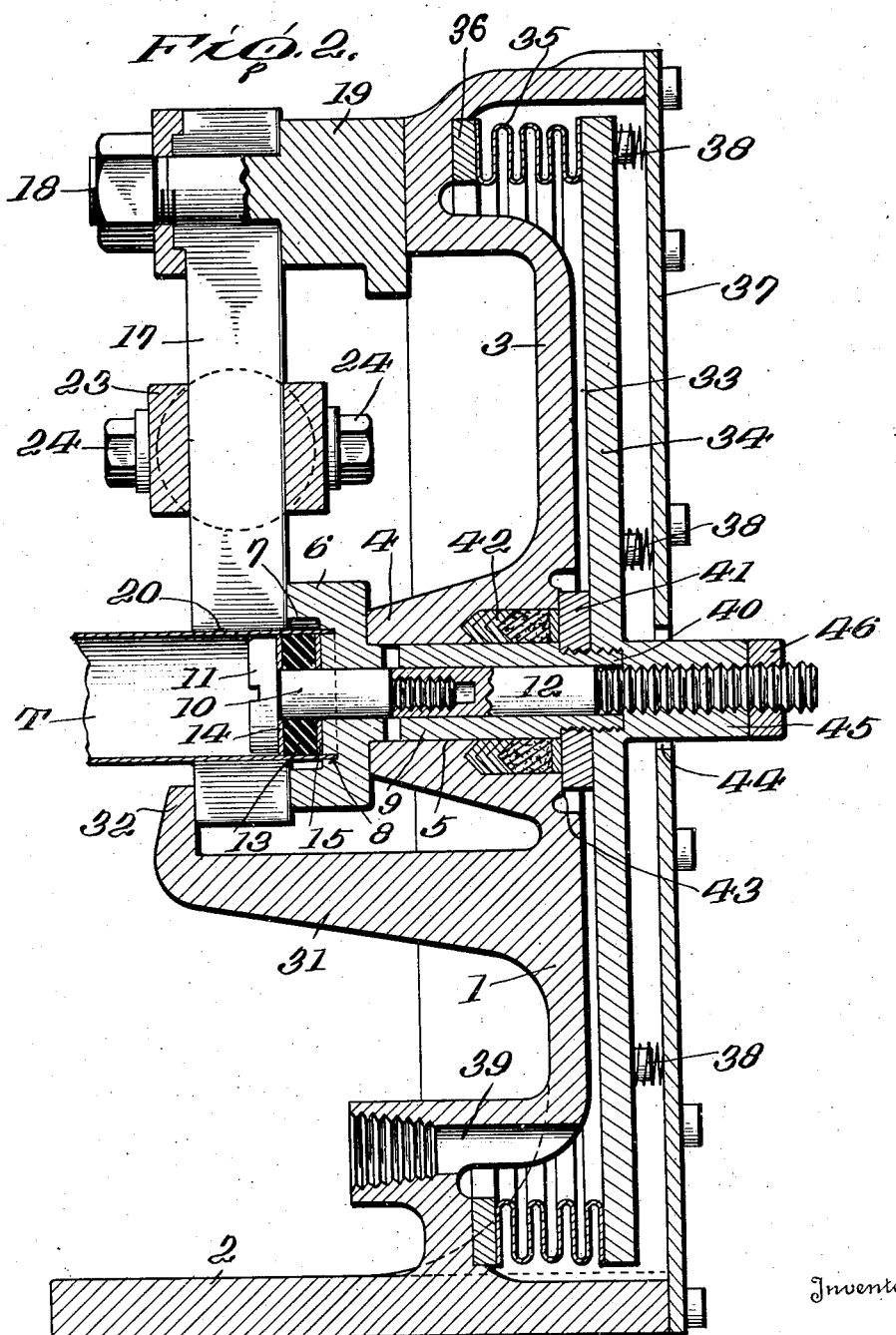

2,417,202

UNITED STATES PATENT OFFICE 2,417,202

MACHINE FOR BEADING OR FLANGING TUBES

Henry E. Hull and Emmett C. Hartley, Cleveland, Ohio, assignors to The Parker Appliance Company, Cleveland, Ohio, a corporation of Ohio Application May 20, 1943, Serial No. 487,770

6 Claims. (Cl. 153—79)

This invention relates to new and useful improvements in a machine for deforming the end portion of a tube outwardly, and more particularly to an apparatus for beading a tube adjacent its end or flaring end portion of the tube.

An object of the invention is to provide a machine of the above type wherein the tube is deformed outwardly by a ring shaped member of elastic deformable material, such as rubber, which is inserted within the tube and then compressed for radially expanding the tube.

A further object of the invention is to provide a machine of the above type, wherein metal washers are placed at the sides of the ring of deformable material, and the deformable material is of a character so that it can be vulcanized to the washers and thereby prevented from expanding around the edges of the washers during the radial expansion of the ring for deforming the tube.

A still further object of the invention is to provide a machine of the above type, wherein a die and movable pressure-applying head is associated with the ring for bringing about the expansion of the ring and for limiting the extent to which the tube is deformed.

A still further object of the invention is to provide a machine of the above type, wherein the die has an open recess to receive the end portion of the tube which is to be deformed so that the tube after the deformation of the end may be removed from the recess, and wherein said recess is closed by chuck members which are shaped to engage the tube portion extending into the recess.

A still further object of the invention is to provide a machine of the above type, wherein the pressure-applying head for deforming the ring is moved for compressing the ring by a fluid operated piston.

These and other objects will be obvious and will in part be more fully disclosed hereinafter.

In the drawings which show by way of illustration one embodiment of the invention:

Figure 1 is a front view of a machine embodying the improvements.

Figure 2 is a sectional view on the line A—A of Figure 1.

Figure 3 is a detail view in plan showing the chucks and the means for operating and controlling the same.

Figure 4 is a sectional view showing the tube expanded and the shape given to the ring when expanded due to the vulcanizing of the ring to the washers associated therewith.

The machine for deforming the end portion of the tube as illustrated in the drawings is adapted for forming an outwardly projecting bead in the inner tube adjacent the end thereof. The machine includes a frame 1 mounted on a supporting base 2 of any desired shape and construction. The frame includes an upstanding plate 3 provided with a projecting boss 4 having a bore 5 therethrough. Mounted in the outer end of this bore 5 is a die 6, which is provided with a recess 7 in the outer face thereof. This die is rigidly secured to the frame. When the tube is to be beaded, the inner wall of the recess 7 is provided with an annular groove 8 which is concentric to the center line of the die and is adapted to receive the end portion of a tube T which is to be beaded.

Mounted in the bore 5 is a sleeve 9 which is adapted to be freely moved endwise in the bore. Attached to this sleeve 9 is a stem 10 carrying a pressure-applying head 11. The head and stem are preferably integral and the stem has a reduced threaded portion which is connected to a rod 12, the purpose of which will be hereinafter described.

Mounted on the stem 10 is a ring-shaped member 13 of elastic deformable material, preferably rubber. Mounted on the stem between this ring and the head 11 is a metal washer 14. Also mounted on the stem between the ring and the inner wall of the recess 7 is a metal washer 15. The rubber ring is vulcanized to these washers. When the pressure head is moved to the right, as viewed in Figure 2, the ring of deformable material will be pressed between the washers 14 and 15 and caused to radially expand. The head and the washers are dimensioned so as to fit loosely within the tube, and the ring initially is of practically the same diameter as the washers. The outer end of the head 11 is rounded, and this facilitates the passing of the tube, which is to be beaded, over the deformable ring and into the groove 8 of the die.

Associated with the die are two chuck jaws 16 and 17. These jaws are mounted on a common pivot 18 carried by a bracket 19 which is bolted to the frame 1 of the machine. Each jaw is provided with a semi-circular recess 20 which conforms to the tube being beaded. These jaws are dimensioned so as to fit fairly close to a tube of maximum outer diameter and serve to close the recess 7 in the die 6.

A lever 21 is pivoted at 22 to the jaw 16. A pair of links 23 are pivoted to the lever 21 at 24. Said links are also pivoted to the jaw 17. Said pivotal connection between the links and the jaw 17 is in the form of a spherical head fitting in recesses in the jaw, the head of one of said links is indicated in dotted lines at 27 in Figure 1. The shoulder 28 on the jaw 17 serves as a stop for the swinging of the jaws to separate them from the tube. Pins 29, 29 mounted on the bracket 19 also serve as stops to limit the outer movement of the chuck members. A shoulder 30 on the jaw 17 serves to limit the movement of the lever when the chuck members are moved to closed position, and in this position the pivot pin 24, the center of the head 25 and the pivot pin 22 are in alignment and therefore the chuck members will be held locked in closed position.

In order to prevent lateral endwise shifting of the chuck members the frame member 1 is provided with a laterally projecting bracket 31 carrying an upstanding lug 32 which engages the outer face of the chuck members, and this holds the chuck members when positioned relative to the die 6 so as to prevent any lateral movement thereof during the beading operation.

The plate 3 of the frame forms one wall of a fluid chamber 33. The other wall of this fluid chamber is indicated at 34. A metallic bellows 35 is welded to the member 34 constituting the outer wall of the chamber, and it is also welded to a ring 36 which is secured to the member 3 forming the inner wall of the chamber. There is a plate 37 secured to the lateral projecting wall of the frame for closing the recess in which the movable plate 34 is mounted. There are a series of springs 38 placed between the members 37 and 34, and these normally shift the plate 34 to the left, as viewed in Figure 2. Fluid may be directed into the chamber 33 from any suitable source to an inlet port 39. When fluid under pressure is directed to this chamber 33, it will force the plate 34 to the right, as viewed in Figure 2.

The sleeve 9 is provided with a hub 40. This hub extends into the plate 34. The plate has a ring 41 welded to its under face and this ring and the plate have a threaded connection with the hub. There is a suitable packing 42 disposed in a recess in the boss 4 for preventing fluid directed to the chamber 33 from passing out through the boss. There is an annular stop shoulder 43 against which the ring 41 contacts when the pressure of the springs 38 is greater than the fluid pressure in the chamber 33.

The rod 12 extends through the sleeve hub 40 and also through an opening 44 in the wall 37. The end portion of this stem 12 is threaded and a sleeve 45 is threaded onto the stem and bears against the end of the hub 40 and also the outer face of the plate 34. A lock nut 46 secures this sleeve in a set position. The sleeve is adjusted on the stem so as to bring the pressure head 11 into contact with the washer 14, and so as to hold the expansible ring 13 and the washer 15 in contact with the inner wall of the recess 7. However, in their normal position, there is no pressure applied to the ring 13. When it is desired to bead a tube, it is slipped over the pressure head 11 and the end inserted in the groove 8. The chuck jaws 16 and 17 serve to center the tube and also to close the recess 7. Fluid is then admitted to the chamber 33, which forces the plate 34 to the right, and this will move the stem 12 to the right, causing the head 11 to press upon the washer 14 and compress the deformable ring 13. Inasmuch as the ring cannot expand laterally or inwardly, it necessarily expands outwardly, as shown in Figure 4. The outward expansion of the ring 13 bearing against the inner wall of the tube will deform the tube outwardly into a bead, indicated at T' in Figure 4.

It is noted that the deformable material is vulcanized to the washers 14 and 15 and therefore when the ring is deformed, it will expand outwardly against the tube and will not expand laterally over the ends of the washers into the recesses a, a. This enables the full effective pressure of the deformed ring 13 to be applied to the tube for forming the same into a bead. It also gives a very nicely curved shape to the bead, as shown in Figure 4. Then again when the ring is fixed to the washers by vulcanizing there is no movement between the contacting faces of the washers and the ring when said deformable material is compressed and expanded. This greatly reduces the wear and prolongs the life of the deformable material.

As the wall of the tube is beaded outwardly under the pressure exerted by the ring, it is brought into contact with the cylindrical wall 7a of the recess 7 in the die, and this limits any further expansion of the tube. In other words, the diameter of the bead formed is controlled by the die rather than the fluid pressure exerted on the expansible ring 13. After the bead has been completed, then the pressure on the fluid chamber is released and the springs will move the plate 34 to the right and the pressure head to the left, thus releasing the deformable ring from lateral pressure, and it will return to its normal cylindrical shape. The lever 21 is then swung so as to open the chucks and this removes the outer wall of the recess so that the tube with the raised bead thereon may be withdrawn.

The die 6 is made so that it can be readily detached from the boss 4 and a die of different dimensions substituted therefor for beading tubes of other diameters. The stem 10 can also be readily disconnected from the rod 12 and a different pressure head attached to conform to the size of the tube which is to be beaded. A different expansible ring and associated washers will also be substituted. The chuck levers can also be readily removed and other levers substituted therefor conforming to the shape of the tube which is to be beaded. It will readily be seen, therefore, that the machine can be changed to bead tubes of different sizes. By changing the shape of the die the machine can be readily adapted for flaring the end of a tube, and therefore it is understood that while the invention has been described in detail as arranged for beading a tube, that in the broader aspect of the invention the machine may be readily adapted for flaring tubes.

It is obvious that many changes in the details of construction and arrangement of the parts may be made without departing from the spirit of the invention as set forth in the appended claims.

We claim:

1. A machine for shaping the end portion of a tube comprising a die member having a recess adapted to receive the end of the tube to be shaped, means for centering said tube in said recess and serving as a tube end abutment definitely placing the tube end with relation to said recess, a stem mounted for endwise movement in the die member and projecting into the recess, a pressure head on the end of said stem of a diameter for loose fit within the tube to be shaped, a ring of elastic deformable material disposed between said pressure head and the inner wall of the recess, and a fluid pressure means connected to said stem for moving the same in a direction toward said tube end abutment to cause the head to press the ring against the inner wall of the die for expanding the ring radially into contact with the tube for deforming the tube to the desired shape.

2. A machine for shaping the end portion of a tube comprising a die member having a recess adapted to receive the ends of the tube to be shaped, means for centering said tube in said recess and serving as a tube end abutment definitely placing the tube end with relation to said recess, a stem mounted for endwise movement in the die member and projecting into the recess, a pressure head on the end of said stem of a diameter for loose fitting within the tube to be shaped, a ring of elastic deformable material mounted on said stem and disposed between said pressure head and the inner wall of the recess, and means directly attached to the stem for moving said stem so as to cause the head to compress the deformable ring for radially expanding the same into contact with the tube to deform the tube to the desired shape in said recess.

3. A machine for shaping the end portion of a tube comprising a die member having a recess adapted to receive the end of the tube to be shaped, means for centering said tube in said recess and serving as a tube end abutment definitely placing the tube end with relation to said recess, a stem mounted for endwise movement in the die member and projecting into the recess, a pressure head on the end of said stem of a diameter for loose fitting within the tube to be shaped, a ring of rubber surrounding the stem, metal washers disposed one at each side of and engaging said ring, said ring having its washer engaging faces fixed to said washers and said ring and washers being disposed between the pressure head and the inner wall of the die and of initial diameter substantially the same as the pressure head, and means directly attached to the stem for moving said stem endwise for compressing the ring for expanding the same radially into contact with the tube for deforming the same to the desired shape in said recess.

4. A machine for shaping the end portion of the tube comprising a die member having a recess with an annular groove in the inner wall thereof adapted to receive the end of the tube to be shaped and form an end abutment therefor, chuck members having recesses therein conforming to the shape of the tube and disposed when in closed position at the outer side of the die for closing said recess, a stem mounted for endwise movement in said die and projecting into said recess, a pressure head carried by the inner end of said stem, a rubber ring on said stem, metal washers disposed one at each side of and engaging said ring, said ring having its washer engaging faces firmly fixed to said washers so that said faces are restrained from radial movement relative to said washers and being free to expand radially only between the planes in which said faces lie when the washers partake of relative movement toward each other, said ring and washers being disposed between the head and the inner wall of the die, said washers and ring being initially of a diameter so as to permit the tube to be freely passed thereover into the groove, and means for moving said stem endwise for bringing about relative movement of said washers toward each other for compressing the ring and expanding the same radially into contact with the tube for deforming the tube to the desired shape in said recess.

5. A machine for shaping the end portion of the tube comprising a die member having a recess with an annular groove in the inner wall thereof adapted to receive the end of the tube to be shaped and form an end abutment therefor, chuck members having recesses therein conforming to the shape of the tube and disposed when in closed position at the outer side of the die for closing said recess, a stem mounted for endwise movement in said die and projecting into said recess, a pressure head carried by the inner end of said stem, a rubber ring on said stem, metal washers disposed one at each side of and engaging said ring, said ring having its washer engaging faces firmly fixed to said washers so that said faces are restrained from radial movement relative to said washers and being free to expand radially only between the planes in which said faces lie when the washers partake of relative movement toward each other, said ring and washers being disposed between the head and the inner wall of the die, said washers and ring being initially of a diameter so as to permit the tube to be freely passed thereover into the groove, and means for moving said stem endwise for bringing about relative movement of said washers toward each other for compressing the ring and expanding the same radially into contact with the tube for deforming the tube to the desired shape in said recess, said last named means comprising fluid pressure means connected to said stem for moving the same endwise in a direction toward said tube end abutment for compressing the ring and expanding the same radially into contact with the tube for deforming the tube to the desired shape in said recess.

6. A machine for shaping the end portion of the tube comprising a die member having a recess with an annular groove in the inner wall thereof adapted to receive the end of the tube to be shaped and form an end abutment therefor, chuck members having recesses therein conforming to the shape of the tube and disposed when in closed position at the outer side of the die for closing said recess, a stem mounted for endwise movement in said die and projecting into said recess, a pressure head carried by the inner end of said stem, a rubber ring on said stem, metal washers disposed one at each side of and engaging said ring, said ring having its washer engaging faces firmly fixed to said washers so that said faces are restrained from radial movement relative to said washers and being free to expand radially only between the planes in which said faces lie when the washers partake of relative movement toward each other, said ring and washers being disposed between the head and the inner wall of the die, said washers and ring being initially of a diameter so as to permit the tube to be freely passed thereover into the groove, and means for moving said stem endwise for bringing about relative movement of said washers toward each other for compressing the ring and expanding the same radially into contact with the tube for deforming the tube to the desired shape in said recess, said last named means comprising a frame supporting the die member, the chucks and the stem, said frame having a recess therein, a movable plate disposed in said recess and connected by an expansible means to the wall of the recess for forming a fluid tight chamber, springs for moving the plate toward the wall of the recess, and means for connecting the plate to the stem for moving said stem when pressure is directed into said chamber so as to compress the ring and expand the same radially into contact with the tube for deforming the tube to the desired shape in said die recess.

HENRY E. HULL.
EMMETT C. HARTLEY.

REFERENCES CITED

The following references are of record in the file of this patent:

UNITED STATES PATENTS

| Number | Name | Date |
|---|---|---|
| 2,050,230 | Mantle | Aug. 4, 1936 |
| 2,044,711 | Mantle | June 16, 1936 |
| 1,879,663 | Dreyer | Sept. 27, 1932 |
| 247,841 | Mayall | Oct. 4, 1881 |
| 2,306,018 | Fentress | Dec. 22, 1942 |
| 2,225,081 | O'Hare | Dec. 17, 1940 |
| 1,041,406 | Bauroth | Oct. 15, 1932 |

FOREIGN PATENTS

| Number | Country | Date |
|---|---|---|
| 16,562 | British | July 6, 1895 |
| 545,620 | British | June 4, 1942 |
| 525,913 | British | Sept. 6, 1940 |